(12) United States Patent
Tomono (10) Patent No.: US 12,265,396 B2
(45) Date of Patent: Apr. 1, 2025

(54) INFORMATION PROCESSING DEVICE AND MOBILE ROBOT

(71) Applicant: Chiba institute of technology, Chiba (JP)

(72) Inventor: Masahiro Tomono, Chiba (JP)

(73) Assignee: CHIBA INSTITUTE OF TECHNOLOGY, Chiba (JP)

( * ) Notice: Subject to any disclaimer, the term of this patent is extended or adjusted under 35 U.S.C. 154(b) by 511 days.

(21) Appl. No.: 17/435,250

(22) PCT Filed: Mar. 13, 2019

(86) PCT No.: PCT/JP2019/010328
§ 371 (c)(1),
(2) Date: Aug. 31, 2021

(87) PCT Pub. No.: WO2020/183659
PCT Pub. Date: Sep. 17, 2020

(65) Prior Publication Data
US 2022/0137638 A1    May 5, 2022

(51) Int. Cl.
*G05D 1/00* (2024.01)
*G01S 17/08* (2006.01)
(Continued)

(52) U.S. Cl.
CPC ............ *G05D 1/0274* (2013.01); *G01S 17/08* (2013.01); *G01S 17/89* (2013.01); *G05D 1/0248* (2013.01);
(Continued)

(58) Field of Classification Search
CPC .............. G01C 21/30; G01C 21/3837; G01C 21/3848; G01S 17/08; G01S 17/89;
(Continued)

(56) References Cited

U.S. PATENT DOCUMENTS 8,060,254 B2 * 11/2011 Myeong ............... G05D 1/0246
701/25
11,820,001 B2 * 11/2023 Nam ..................... G05D 1/0295
(Continued)

FOREIGN PATENT DOCUMENTS

CN    105953798 A  *  9/2016 ............. G05D 1/024
CN    105953798 B       9/2018
(Continued)

OTHER PUBLICATIONS

Machine Translation of CN-105953798-A obtained from Clarivate Analytics on Dec. 13, 2023 (Year: 2016).*
(Continued)

*Primary Examiner* — Thomas Ingram
*Assistant Examiner* — Michael J Herrera
(74) *Attorney, Agent, or Firm* — Rankin, Hill & Clark LLP (57) ABSTRACT

Provided are an information processing device and a mobile robot capable of ensuring the accuracy of estimation of a self-position even with an environmental change and maintaining the consistency of the self-position on a map. The information processing device of the mobile robot includes a control section and a detection section configured to detect a distance to a peripheral object and the direction thereof as detection information. The control section includes a storage, a map producer configured to produce a peripheral map, an existing map self-position estimator configured to estimate a current self-position based on an existing map, a current map self-position estimator configured to estimate the current self-position based on a current map, a reliability evaluator configured to evaluate the reliability of each of the estimated self-positions, and a self-position updater configured to update either one of the self-positions based on the reliability.

9 Claims, 4 Drawing Sheets

(51) Int. Cl.
  *G01S 17/89* (2020.01)
  *G06T 7/579* (2017.01)
(52) U.S. Cl.
  CPC ............ *G05D 1/0272* (2013.01); *G06T 7/579* (2017.01); *G06T 2207/10028* (2013.01); *G06T 2207/30252* (2013.01)
(58) Field of Classification Search
  CPC .. G01S 7/4808; G05D 1/0248; G05D 1/0272; G05D 1/0274; G05D 2201/02; G06T 2207/10028; G06T 2207/30252; G06T 7/579
  See application file for complete search history.

(56) References Cited

U.S. PATENT DOCUMENTS

| | | | |
|---|---|---|---|
| 2014/0376777 A1 | 12/2014 | Churchill et al. | |
| 2016/0062361 A1* | 3/2016 | Nakano | G05D 1/024 701/25 |
| 2016/0231744 A1* | 8/2016 | Kaname | G05D 1/0274 |
| 2017/0010618 A1* | 1/2017 | Shashua | G01C 21/3841 |
| 2017/0153641 A1* | 6/2017 | Serizawa | G08G 1/16 |
| 2018/0074201 A1* | 3/2018 | Sakai | G01S 17/06 |
| 2018/0079085 A1 | 3/2018 | Nakata et al. | |
| 2018/0202814 A1* | 7/2018 | Kudrynski | G06T 7/75 |
| 2018/0225524 A1 | 8/2018 | Fujita | |
| 2018/0364717 A1 | 12/2018 | Douillard et al. | |
| 2020/0081136 A1 | 3/2020 | Wang | |
| 2020/0132462 A1* | 4/2020 | Shibata | G01C 25/005 |
| 2020/0306989 A1* | 10/2020 | Vogel | B25J 9/1653 |
| 2021/0026356 A1* | 1/2021 | Kobayashi | G08G 1/166 |
| 2021/0271257 A1* | 9/2021 | Watanabe | G06F 18/24 |

FOREIGN PATENT DOCUMENTS

| | | |
|---|---|---|
| JP | 2015-508163 A | 3/2015 |
| JP | 2017-045447 A | 3/2017 |
| JP | 2017-083230 A | 5/2017 |
| JP | 2018-084492 A | 5/2018 |
| JP | 2018-128314 A | 8/2018 |
| WO | 2018/166287 A1 | 9/2018 |

OTHER PUBLICATIONS

International Search Report dated May 28, 2019 issed in PCT/JP2019/010328.
European Search Report issued on Sep. 28, 2022 for European Patent Application No. 19919202.2.

* cited by examiner

INFORMATION PROCESSING DEVICE AND MOBILE ROBOT

TECHNICAL FIELD

The present invention relates to an information processing device and a mobile robot.

BACKGROUND ART

Typically, a technique called simultaneous localization and mapping (SLAM) and employed for self-position estimation and environmental map production has been used as the technique of causing an autonomously-travelable mobile body such as a mobile robot or a self-driving car to autonomously travel. As an environmental map, an occupied grid map or a point cloud map produced based on the presence or absence of an object in a movement area of the mobile body is used in some cases. In the occupied grid map, a plane or a space in the movement area is divided into multiple sections (cells) and is stored, and a cell value corresponding to the presence or absence of the object is assigned to each divided section. The point cloud map represents, as a point (coordinates) discretized into each minute region, the object present in the plane or the space in the movement area, and as the map, utilizes point cloud data which is the group of these points.

In a case where the mobile body autonomously travels to a destination, a movement path from a current location to the destination is obtained, and the mobile body travels to the destination along such a movement path. In this case, for efficient movement, the movement path is calculated using a map (an existing map) produced in advance, and the mobile body travels while checking (estimating) a self-position on the existing map. Such self-position estimation on the existing map is an essential technique for autonomous traveling of the mobile body.

As the technique of estimating the self-position of the mobile body, a method in which positioning of the mobile body on the environmental map prepared in advance is performed using distance data (detection information) obtained from the output of a distance sensor and the self-position is estimated thereafter is generally employed. For example, as the method for positioning the mobile body, a method called an iterative closest point (ICP) is employed. In this method, the position of the mobile body is determined by checking against a characteristic portion of the environmental map based on a geometrical characteristic of the group of points extracted from the point cloud data (see, e.g., Patent Literature 1). In the self-position estimation method described in Patent Literature 1, the periphery of the mobile body is observed by the distance sensor, and in this manner, multiple three-dimensional points indicating an object surface are acquired. Based on such an observation result, characteristic amounts of the multiple three-dimensional points are calculated. Multiple ones of the three-dimensional points of which characteristic amounts are equal to or greater than a characteristic amount threshold are extracted from both of a close range and a long range. The self-position is estimated by matching among the extracted multiple three-dimensional points and the multiple three-dimensional points on the environmental map.

As the technique of estimating the self-position of the mobile body, there is a method called an odometry. In this method, a movement amount (the detection information) is calculated using a wheel rotation angle, and the self-position is estimated based on the movement amount. In this method, the position of the mobile body is determined by checking of self-position information based on the movement amount against the environmental map. However, in the self-position estimation method based on the odometry, an odometry error is caused in a case where the vehicle turns or a wheel idles. This degrades the accuracy of estimation of the self-position. For this reason, a technique has been proposed, in which self-position estimation based on the odometry and positioning based on the ICP by means of the distance sensor as described above are used in combination to improve the accuracy of estimation of the self-position (see, e.g., Patent Literature 2).

CITATION LIST

Patent Literature

PATENT LITERATURE 1: JP-A-2017-083230
PATENT LITERATURE 2: JP-A-2018-084492

SUMMARY OF THE INVENTION

Problems to be Solved by the Invention

However, any of the typical techniques described in Patent Literatures 1 and 2 estimates the self-position of the mobile body by matching of the detection information with the environmental map prepared in advance, and for this reason, it is difficult to make matching with the environmental map or the accuracy of matching is degraded in a case where the environment has changed. In some cases, the accuracy of estimation of the self-position is significantly degraded.

An object of the present invention is to provide an information processing device and a mobile robot capable of ensuring the accuracy of estimation of a self-position even with an environmental change and maintaining the consistency of the self-position on a map.

Solutions to the Problems

The information processing device of the present invention is an information processing device for estimating a self-position of a mobile body based on a map of environment where the mobile body travels. The information processing device includes a detection section configured to detect, as detection information, a distance to an object at the periphery of the mobile body and the direction of the object and a control section configured to control the detection section. The control section includes a storage configured to store the detection information, which has been detected by the detection section, in chronological order and store a map, a map producer configured to produce a map of the periphery of the mobile body based on the detection information stored in the storage and store the map in the storage, an existing map self-position estimator configured to estimate a current self-position of the mobile body based on an existing map previously produced and stored in the storage, a current map self-position estimator configured to estimate the current self-position of the mobile body based on a current map being currently produced and stored in the storage, a reliability evaluator configured to evaluate the reliability of each self-position estimated by the existing map self-position estimator and the current map self-position estimator, and a self-position updater configured to update either one of the self-positions based on the reliability evaluated by the reliability evaluator.

According to such an aspect of the present invention, the self-position updater updates either one of the self-positions estimated by the existing map self-position estimator and the current map self-position estimator based on the reliability of each of the self-positions evaluated by the reliability evaluator. Thus, the consistency of each of the self-positions estimated by the existing map self-position estimator and the current map self-position estimator can be established. Thus, even in a case where the environment where the mobile body repeatedly moves has been changed, the reliability of the self-position is evaluated based on both of the existing map and the current map so that the accuracy of estimation of the self-position according to an environmental change can be improved.

In the present invention, the self-position updater preferably calculates a movement amount of each of the self-positions estimated by the existing map self-position estimator and the current map self-position estimator, and preferably updates either one of the self-positions based on the calculated movement amount.

According to such a configuration, the self-position updater calculates the movement amount of each of the self-positions estimated by the existing map self-position estimator and the current map self-position estimator, and updates either one of the self-positions based on the calculated movement amount. Thus, the consistency of each self-position can be established even in a case where the existing map and the current map are different from each other in a shape. That is, even at the same location, the shapes of the existing map and the current map are not coincident with each other in many cases due to a different traveling path of the mobile robot and different sensor noise. With a difference in a map shape, a map consistency cannot be always established even when the self-position on one map is directly used for the other map. On the other hand, the movement amount of the self-position on the existing map and the current map is calculated, and each self-position is updated based on such a movement amount. Thus, the accuracy of estimation of the self-position can be enhanced while an error is reduced.

In the present invention, the self-position updater preferably updates the self-position evaluated as a lower reliability by the reliability evaluator based on the self-position evaluated as a higher reliability.

According to such a configuration, the self-position updater updates the self-position evaluated as a lower reliability by the reliability evaluator based on the self-position evaluated as a higher reliability. Thus, the accuracy of estimation of each self-position can be improved.

In the present invention, the reliability evaluator preferably sets a weight indicating the reliability of each self-position to a greater weight as the reliability of each self-position increases, and preferably sets the weight to a smaller weight as the reliability of each self-position decreases. The self-position updater preferably updates at least either one of the self-positions based on the weight set by the reliability evaluator.

According to such a configuration, the self-position updater updates at least either one of the self-positions estimated by the existing map self-position estimator and the current map self-position estimator based on the weight indicating the reliability of each self-position and set by the reliability evaluator. Thus, the reliability of each self-position can be evaluated in a stepwise manner, and the consistency of each self-position can be established with a favorable efficiency.

The mobile robot of the present invention includes the above-described information processing device and a mobile section configured to move the mobile body.

According to such an aspect of the present invention, the mobile robot includes the information processing device and the mobile section. The self-position updater included in the control section of the information processing device updates either one of the self-positions estimated by the existing map self-position estimator and the current map self-position estimator based on the reliability of each self-position evaluated by the reliability evaluator, and therefore, the consistency of each of the self-positions estimated by the existing map self-position estimator and the current map self-position estimator can be established.

DESCRIPTION OF THE EMBODIMENTS

Hereinafter, one embodiment of the present invention will be described based on FIGS. 1 to 5.

Figure 1:
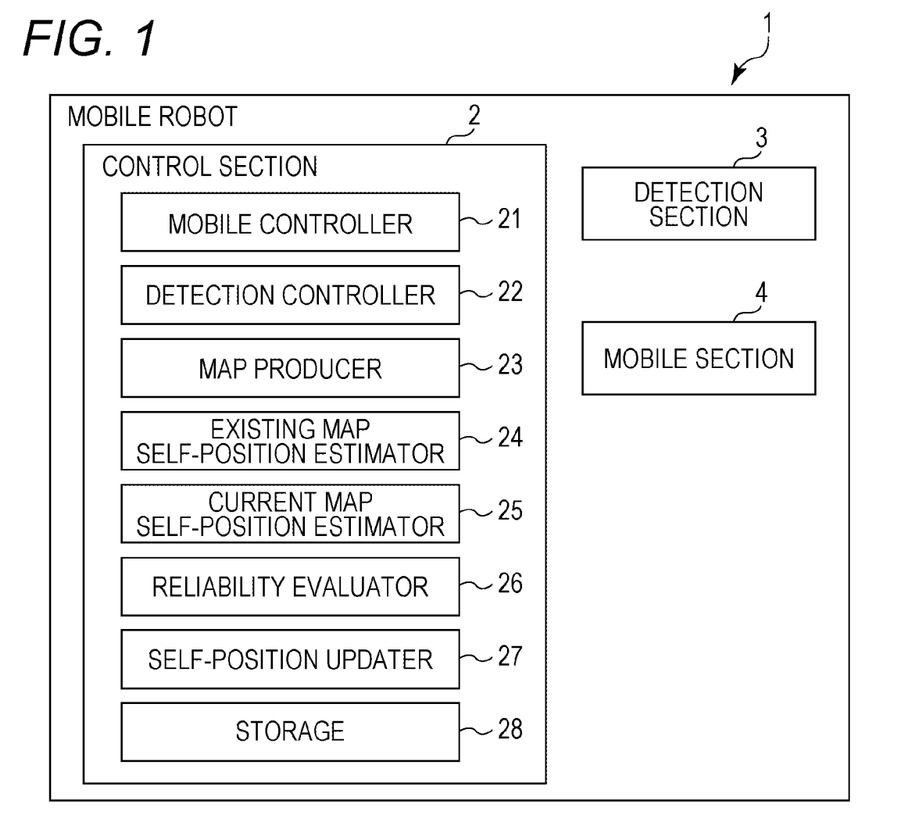
FIG. 1 is a block diagram of a mobile robot according to one embodiment of the present invention.

FIG. 1 is a block diagram of a mobile robot 1 according to one embodiment of the present invention.

The mobile robot 1 as a mobile body of the present embodiment includes, as shown in FIG. 1, a control section 2, a detection section 3, and a mobile section 4. The control section 2 and the detection section 3 form an information processing device. The detection section 3 has a laser scanner configured to emit beams to the periphery of the mobile robot 1 to detect the presence or absence of an object, and acquires detection information on each emitted beam. The mobile robot 1 estimates a self-position by a SLAM technique and an odometry. The mobile section 4 has a driver such as a motor and a wheel to be rotatably driven by the driver, and causes the mobile robot 1 to autonomously travel and to acquire a movement amount (the detection information) by means of a wheel rotation angle to estimate the self-position by the odometry.

The control section 2 includes an arithmetic section such as a CPU and a storage section such as a ROM or a RAM to control operation of the mobile robot 1, and includes a mobile controller 21 configured to control the mobile section 4 and a detection controller 22 configured to control the detection section 3. Further, the control section 2 includes a map producer 23 configured to produce a map of the periphery of the mobile robot 1 as described later and an existing map self-position estimator 24 and a current map self-position estimator 25 configured to estimate the self-position of the mobile robot 1. In addition, the control section 2 includes a reliability evaluator 26 configured to evaluate the reliability of each of the self-positions estimated by the existing map self-position estimator 24 and the current map self-position estimator 25, a self-position updater 27 configured to update either one of the self-positions based on the reliability evaluated by the reliability evaluator 26, and a storage 28 configured to store the detection information acquired by the detection section 3, the map produced by the map producer 23, various types of data and the like. As the map produced by the map producer 23, an optional map such as an occupied grid map or a point cloud map can be utilized. Hereinafter, the case of producing the point cloud map will be described.

For example, the detection section 3 includes the laser scanner (light detection and ranging (LIDAR)) configured to circumferentially emit laser light such as infrared laser to measure a distance to the object. This laser scanner takes sensor center and orientation which are the self-position as a reference position $(x, y, \theta)^T$, and detects the presence or absence and position of the object based on an angle (a direction) about the sensor center. In such object detection (hereinafter sometimes merely referred to as a scan), a detection value for a single cycle (e.g., a single rotation, 360°) of the laser scanner is taken as a single unit (a single scan) based on the beams emitted with a predetermined resolution (e.g., 1°) in detection for the single cycle, and as scan information (the detection information), is stored in chronological order in the storage 28.

The mobile section 4 detects the rotation angle of the wheel rotatably driven by the driver, thereby acquiring the movement amount of the mobile robot 1 and storing such a movement amount as odometry information (the detection information) in the storage 28. In the mobile robot 1 of the present embodiment, the self-position is estimated based on the scan information and the odometry information as the detection information while a current map is sequentially produced by the SLAM technique. In addition, the self-position is estimated in such a manner that an existing map (a reference map) produced previously, repeatedly updated by a later-described method, and stored in the storage 28 and the detection information are checked against each other. Hereinafter, self-position estimation by the SLAM technique will be sometimes merely referred to as "SLAM," and self-position estimation by checking against the reference map will be sometimes merely referred to as "LOC" (localization). A technique for self-position estimation and map production by use of both of the SLAM and the LOC in combination will be described with reference to FIGS. 2 to 5.

Note that the existing map is not necessarily the map previously produced, repeatedly updated by the later-described method, and stored in the storage 28, and may be one transferred from the outside of the mobile robot 1, for example. In other words, it may only be required that the existing map is previously produced and is stored in the storage 28.

Figure 2:
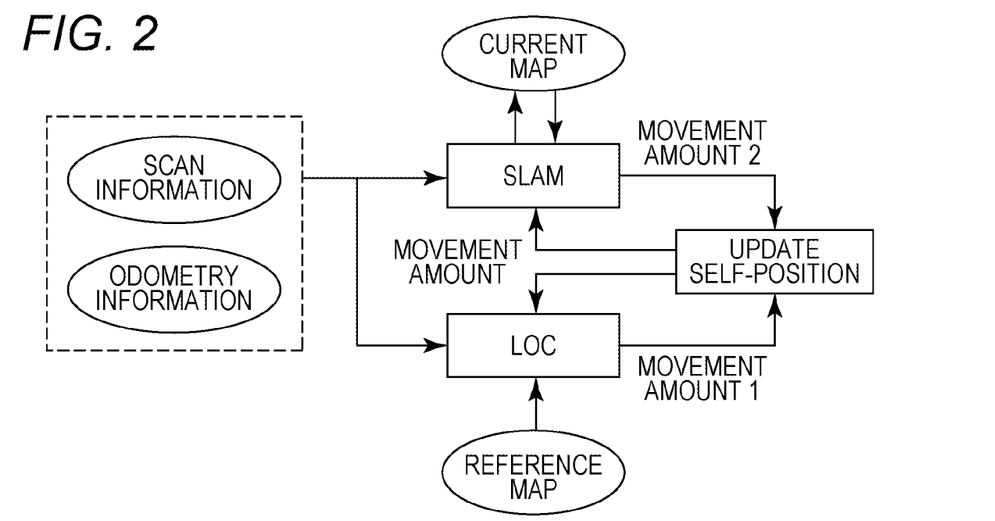
FIG. 2 is a conceptual diagram showing operation of the mobile robot in map production and self-position estimation.

FIG. 2 is a conceptual diagram showing operation of the mobile robot 1 in map production and self-position estimation. As shown in FIG. 2, when the mobile robot 1 acquires the scan information from the detection section 3 and the odometry information from the mobile section 4, the mobile robot 1 estimates the self-position by the SLAM and the LOC. In the SLAM, the current map is produced, and the self-position is estimated based on the produced current map. In the LOC, the self-position is estimated by checking against the reference map (the existing map). After self-position estimation by the SLAM and the LOC, the reliability of each self-position is evaluated and updated. As described above, the mobile robot 1 of the present embodiment estimates the self-position on the current map and the reference map by the SLAM and the LOC in parallel.

Figure 3:
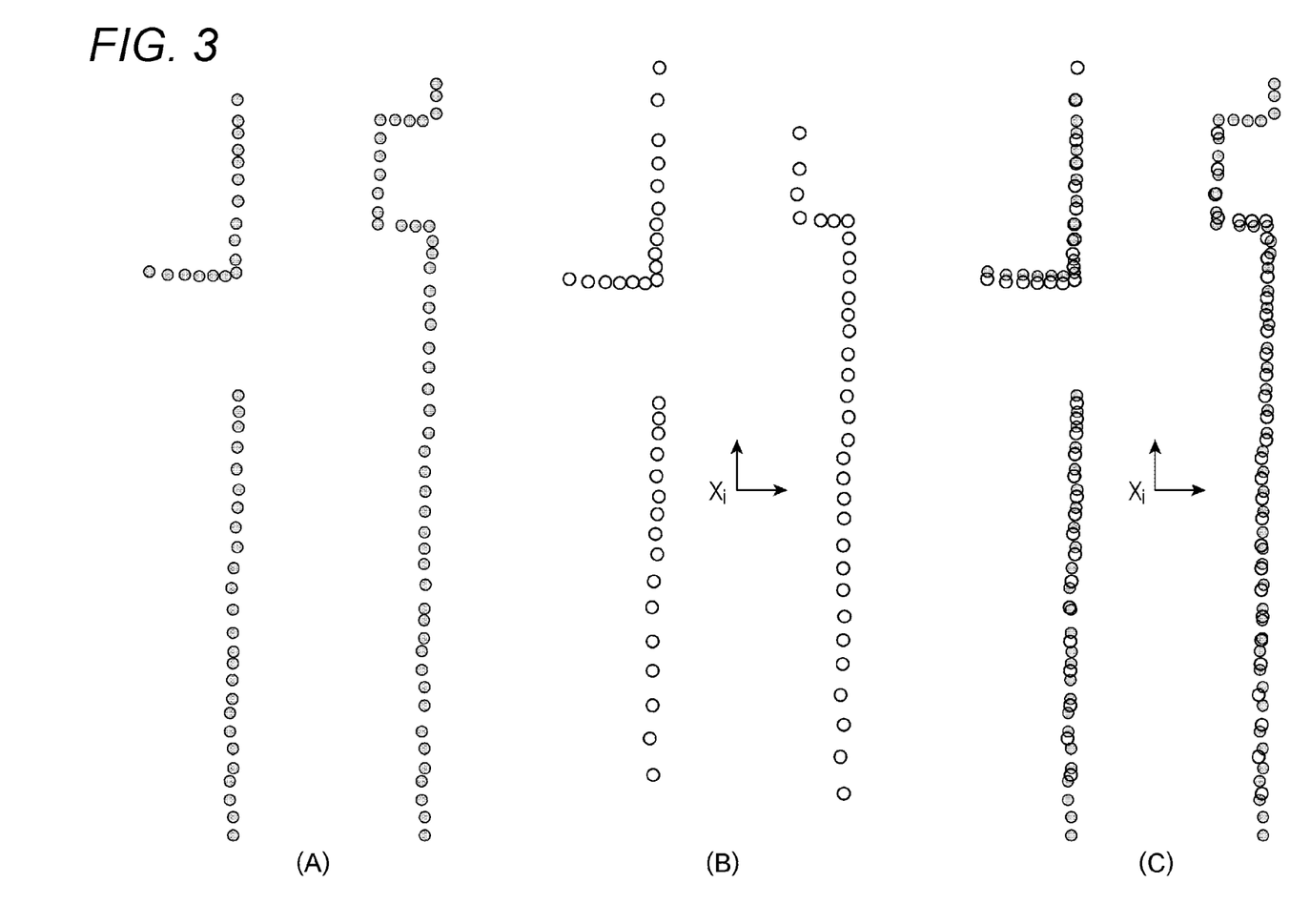
FIG. 3 is a conceptual diagram showing the state of the mobile robot in self-position estimation.
Figure 4:
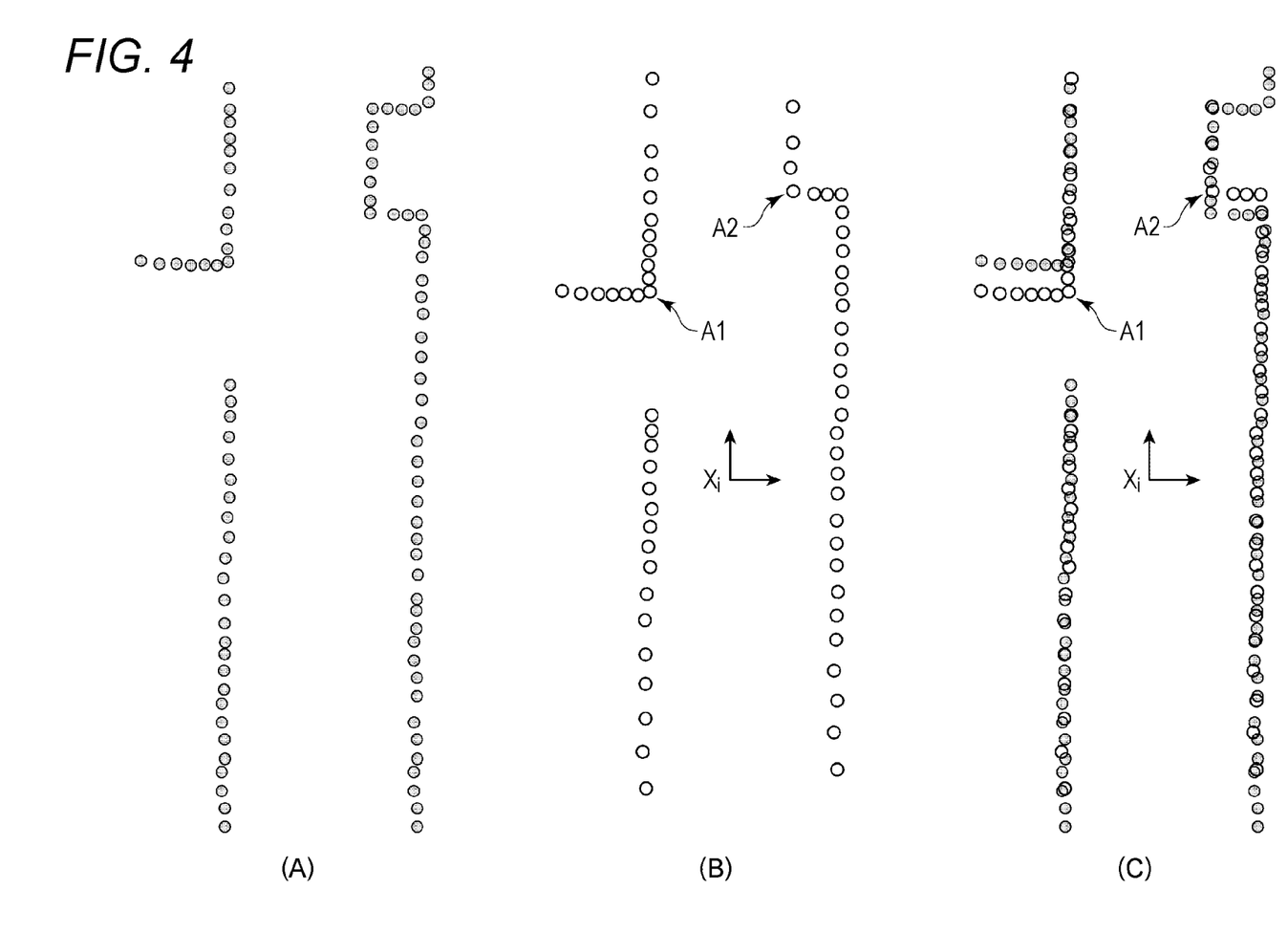
FIG. 4 is a conceptual diagram showing the state of the mobile robot in self-position estimation.

FIGS. 3 and 4 are conceptual diagrams showing the state of the mobile robot 1 in self-position estimation. In each of FIGS. 3 and 4, (A) is a point cloud showing the object on the current map or the reference map, (B) is a point cloud in the scan information detected by the detection section 3, and (C) shows a state in which the point clouds of (A) and (B) overlap with each other. The case of using scan matching by an ICP as a positioning method will be described herein by way of example. For example, the self-position of the mobile robot 1 is determined by positioning by the ICP based on the shape of the point cloud on the current map or the reference map and the shape of the point cloud in the scan information. In scan matching, when the mobile robot 1 has moved from a first position to a second position, the self-position (the movement amount) of the mobile robot 1 is estimated such that the degree of overlap between a current map (or a previously-produced reference map) produced at the first position and scan information scanned at the second position is optimal. In the SLAM, the sequentially-produced current map and the scan information are checked against each other, and in this manner, the current map is repeatedly updated while the self-position is estimated. On the other hand, in the LOC, the previously-produced reference map and the scan information are checked against each other, and in this manner, the self-position on the reference map is estimated.

FIG. 3 shows the state of scan matching by the SLAM, and shows a favorable matching state in which the point cloud on the current map and the point cloud in the scan information favorably overlap with each other. FIG. 4 shows the state of scan matching by the LOC, and shows an unfavorable matching state in which the point cloud on the reference map and the point cloud in the scan information partially shift from each other. That is, the scan information at portions indicated by positions A1, A2 in FIG. 4(B) shifts from the reference map of FIG. 4(A), and this shows the probability of a change between the position or shape of the object present on the previously-produced reference map and the current position or shape of the object. However, there is a probability that in the LOC based on the reference map, the self-position cannot be accurately estimated according to an environmental change such as an object position change as described above. For this reason, in, e.g., scan matching by the ICP as described above, the score of matching of the scan information with the reference map is calculated by Expression (1) below. This matching score G(x) decreases as the state of matching becomes better as in FIG. 3, and increases as the state of matching becomes worse as in FIG. 4.

[Expression 1]

$$G(x) = \frac{1}{N} \sum_{i=1}^{N} \|(Rp_i + t) - qj_i\|^2 \quad (1)$$

In Expression (1), x: a robot position $(x, y, \theta)^T$ at a time point t,

R, t: a rotation matrix and a translation component of x represented by Expression (2) below, $p_i$: an i-th point in a scan at the time point t, and $q_{ji}$: a point in a scan at a time point t−1 corresponding to $p_i$, ji is the number of a point corresponding to i.

[Expression 2]

$$R = \begin{pmatrix} \cos\theta & -\sin\theta \\ \sin\theta & \cos\theta \end{pmatrix}, t = (x, y)^T \quad (2)$$

As described above, the matching score is calculated for the estimated self-position, and the reliability is set based on the matching score. In this manner, the reliability of each of the self-positions estimated by the SLAM and the LOC is evaluated, and either one of the self-positions is updated based on the evaluated reliability. The method for evaluating the reliability of each self-position and updating the self-position by the SLAM and the LOC as described above will be described later.

In the mobile robot 1 of the present embodiment, the current map is produced and the self-position is estimated by the SLAM, and the self-position is estimated with reference to the reference map by the LOC. A better one of the self-positions estimated by these techniques is employed. According to such a self-position estimation method, the SLAM on the current map and self-position estimation on the reference map are performed in parallel, and therefore, the effect of these techniques complementing each other is obtained. That is, even when either one of the SLAM or the LOC fails to estimate the self-position, if the other one of the SLAM or the LOC successfully estimates the self-position, the mobile robot 1 can return to an accurate position, and therefore, robustness is improved.

If the scan information or the odometry information as measurement data is in an unfavorable state, a great error in the self-position estimated by the SLAM is caused. This might lead to distortion of the produced current map. In this case, it is difficult for the mobile robot 1 to return to the accurate position even with normal scan information. For this reason, the LOC is used in combination so that the reference map can be taken as a reference. With the normal scan information, the probability of accurately estimating the self-position can be increased. Further, when the mobile robot 1 moves out of the area of the reference map, scan matching cannot be performed due to the absence of the map, and for this reason, the self-position is estimated only based on the odometry information by the LOC. Only with the odometry information, there is a probability that a position error is accumulated and the self-position is lost. For this reason, the SLAM is used in combination so that the position of the mobile robot 1 can be continuously estimated. Thus, the LOC takes the self-position estimated by the SLAM, and in this manner, the self-position can be obtained with a higher accuracy than that in the case of only the odometry information. This also leads to the effect of the mobile robot 1 easily returning to the accurate position when the mobile robot 1 returns to the inside of the area of the reference map.

Figure 5:
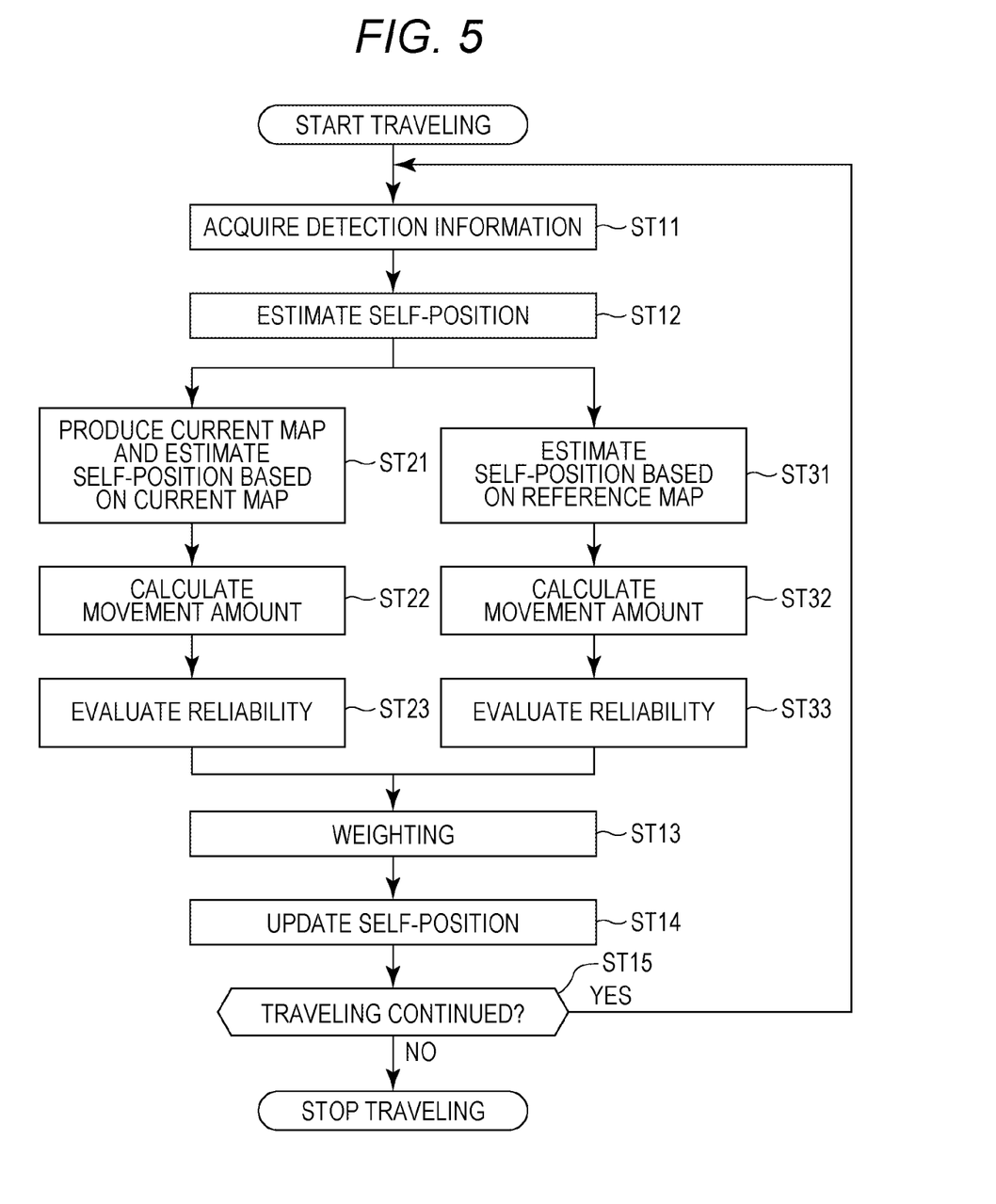
FIG. 5 is a flowchart showing operation of the mobile robot.

Next, operation of the mobile robot 1 will be described in detail with reference to FIG. 5. FIG. 5 is a flowchart showing operation of the mobile robot 1. Note that description of operation relating to traveling of the mobile robot 1 will be omitted and description will be made herein focusing on the steps of estimating the self-position and producing the current map during traveling.

When the mobile section is drivably controlled by the mobile controller 21 of the control section 2 and the mobile robot 1 starts traveling accordingly, the detection section 3 is drivably controlled by the detection controller 22 to start detection of the peripheral object (a detection information acquisition step: a step ST11). At the detection information acquisition step (the step ST11), the detection controller 22 acquires the scan information (the detection information) obtained by detection of the peripheral object by the detection section 3, and stores the acquired scan information in the storage 28. Further, the detection controller 22 acquires the odometry information (the detection information) obtained by detection of the movement amount from the rotation angle of the wheel of the mobile section 4, and stores the acquired odometry information in the storage 28.

The control section 2 estimates the self-position of the mobile robot 1 based on the scan information and the odometry information stored in the storage 28, the produced current map, and the reference map (the existing map) stored in the storage 28 (a self-position estimation step: a step ST12). At the self-position estimation step (the step ST12), steps ST21 to ST23 as the steps of estimating the self-position by the SLAM and steps ST31 to ST33 as the steps of estimating the self-position by the LOC are executed in parallel.

As the steps of estimating the self-position by the SLAM, the control section 2 causes the current map self-position estimator 25 to estimate the current self-position of the mobile robot 1 based on the current map produced so far, the scan information, and the odometry information. Further, the control section 2 causes the map producer 23 to produce the current map, and stores the produced current map in the storage 28 (a current map production step and a self-position estimation step based on the current map: the step ST21). Next, the current map self-position estimator 25 calculates the movement amount between the calculated self-position and the self-position at a previous time point based on these self-positions (a movement amount calculation step: the step ST22). When the current self-position is estimated by the SLAM as described above, the control section 2 causes the reliability evaluator 26 to evaluate the reliability of the self-position (a reliability evaluation step: the step ST23). At the reliability evaluation step (the step ST23), the reliability evaluator 26 calculates the reliability of the self-position based on the result of scan matching as described above. For example, the reliability may be determined from the matching score, or may be determined from the number of matched points. The reliability increases as the matching score decreases in the former case, and proper conversion is performed such that the reliability increases as the number of points increases in the latter case. In a case where the reliability is lower than a predetermined threshold, the reliability may be zero.

As the steps of estimating the self-position by the LOC, the control section 2 causes the existing map self-position estimator 24 to estimate the current self-position of the mobile robot 1 based on the reference map, the scan information, and the odometry information stored in the storage 28 (a self-position estimation step based on the reference map: the step ST31). Next, the existing map self-position estimator 24 calculates the movement amount between the calculated self-position and the self-position at a previous time point based on these self-positions (a movement amount calculation step: the step ST32). When the current self-position is estimated by the LOC as described above, the control section 2 causes the reliability evaluator 26 to evaluate the reliability of the self-position (a reliability evaluation step: the step ST33). At the reliability evaluation step (the step ST33), the reliability evaluator 26 calculates the reliability of the self-position based on the result of scan matching as described above. For example, the reliability may be determined from the matching score, or may be determined from the number of matched points. The reliability increases as the matching score decreases in the former case, and proper conversion is performed such that the reliability increases as the number of points increases in the latter case. In a case where the reliability is lower than a predetermined threshold, the reliability may be zero.

When each self-position is estimated by the SLAM and the LOC and the reliability of each self-position is evaluated as described above, the control section 2 causes the reliability evaluator 26 to set, based on the reliability of each of the self-positions obtained by the SLAM and the LOC, a greater weight to each self-position as the reliability increases (a weighting step: a step ST13). That is, when the reliability of the self-position obtained by the SLAM is 80% and the reliability of the self-position obtained by the LOC is 60%, the weight on the self-position obtained by the SLAM is set as 0.57 (=80/(80+60)) and the weight on the self-position obtained by the LOC is set as 0.43 (=60/(80+60)), for example.

Next, the control section 2 causes the self-position updater 27 to update at least either one of the self-positions based on the weight on each of the self-positions obtained by the SLAM and the LOC (a self-position updating step: a step ST14). The self-position updater 27 updates each self-position based on the movement amount of each self-position calculated at the movement amount calculation step (the steps ST23, ST32) and the weight set to each self-position at the weighting step (the step ST13). Note that at the self-position updating step (the step ST14), the self-position with a lower reliability may be updated (rewritten) with the self-position with a higher reliability regardless of the weight on each self-position. This case is equivalent to the case where the reliability lower than the threshold is set to zero as described above. In a case where the reliability of each of the self-positions obtained by the SLAM and the LOC is higher than the threshold, the self-position estimated by each of these techniques may be directly used. Note that in a case where the reliability of one of the self-positions becomes lower than the threshold, such a self-position is rewritten with the other self-position.

Next, the control section 2 determines, at a step ST15, whether or not traveling of the mobile robot 1 is to be continued. If traveling is continued at the step ST15, the process returns to the detection information acquisition step (the step ST11) to repeat the above-described steps. If traveling is not continued at the step ST15, the control section 2 stops traveling of the mobile robot 1 and stops operation of each section.

According to the present embodiment as described above, the following features/advantageous effects can be provided.

(1) The mobile robot 1 causes the self-position updater 27 to update either one of the self-positions based on the reliability of each self-position estimated by the SLAM and the LOC and evaluated by the reliability evaluator 26 of the control section 2. Thus, consistency between the self-positions estimated by the existing map self-position estimator 24 and the current map self-position estimator 25 can be established. Thus, even in a case where environment where the mobile robot 1 repeatedly moves has been changed, the mobile robot 1 evaluates the reliability of the self-position based on both of the reference map and the current map so that the accuracy of estimation of the self-position according to an environmental change can be improved.

(2) The self-position updater 27 of the control section 2 calculates the movement amount of each of the self-positions estimated by the SLAM and the LOC, and updates either one of the self-positions based on the calculated movement amount. Thus, the consistency of each self-position can be established even in a case where the reference map and the current map are different from each other in a shape, and the accuracy of estimation of the self-position can be enhanced while an error is reduced.

(3) The self-position updater 27 updates at least either one of the self-positions estimated by the SLAM and the LOC based on the weight indicating the reliability of each self-position and set by the reliability evaluator 26. Thus, the reliability of each self-position can be evaluated in a stepwise manner, and the consistency of each self-position can be established with a favorable efficiency. The self-position updater 27 may rewrite the self-position with a lower reliability with the self-position with a higher reliability regardless of the weight on each self-position. This can reduce a calculation cost.

Variations of Embodiment

Note that the present invention is not limited to the above-described embodiment, and variations, modifications and the like within such a scope that the object of the present invention can be achieved are included in the present invention.

For example, in the above-described embodiment, no specific example of the mobile robot 1 has been described. Examples of the mobile robot (the mobile body) include a mobile robot such as a service robot or a home robot. More specifically, the examples include a cleaning robot, a security robot, a conveyance robot, and a guide robot. Further, the mobile body may be a self-driving car or a service car. In addition, a movement area of the mobile body is not limited to a two-dimensional planar space, and may be a three-dimensional space. In this case, the mobile body may be a flying body such as a drone. That is, in the above-described embodiment, the example using 2D-SLAM has been described as the SLAM technique. However, the information processing device of the present invention is also applicable to 3D-SLAM targeted for the three-dimensional space.

In the above-described embodiment, the mobile robot 1 includes the control section 2, and the control section 2 is provided with the map producer 23, the self-position estimators 24, 25 and the like. However, the information processing device is not necessarily provided in the mobile robot 1, and may be provided at other types of equipment communicable with the mobile robot 1 and it may be configured such that the mobile robot 1 autonomously travels based on a map produced by the other types of equipment. Moreover, the mobile body does not necessarily include the mobile section, and may be configured to detect the periphery thereof while a user is manually moving, e.g., a wagon on which the detection section is placed.

In the above-described embodiment, the point cloud map is used as the reference map (the existing map) and the current map, but each of these maps is not limited to the point cloud map and may be the occupied grid map or other maps. Moreover, in the above-described embodiment, the detection section having the laser scanner has been described by way of example, but the present invention is not limited to such a detection section and an optional detection section such as various distance sensors and imaging devices can be utilized. Further, in the above-described embodiment, the odometry information is acquired based on the rotation angle of the wheel of the mobile section, but the present invention is not limited to such a configuration and a movement amount measured by an optical section or a rotation angle measured by a gyroscope or an inertial measurement unit (IMU) may be utilized for the odometry information.

In the above-described embodiment, the self-position updater 27 calculates the movement amount of each of the self-positions estimated by the SLAM and the LOC, and updates either one of the self-positions based on the calculated movement amount. However, the self-position updater 27 may update, regardless of the movement amount, the self-position with the estimated self-positions overlapping with each other on the reference map or the current map. That is, in the above-described embodiment, the self-position is updated after the movement amount has been calculated from each self-position because it is difficult to cause the self-positions to overlap with each other on the reference map or the current map due to a difference in shape between these maps. However, as long as map coordinate systems of the reference map and the current map can be properly converted to each other, the self-positions (coordinate values) can directly overlap with each other on these maps, and therefore, the self-position can be updated without calculation of the movement amount. In addition, in the above-described embodiment, the maps are combined by pose graph combination according to the self-positions estimated by the SLAM and the LOC. However, the map combination method is not limited to use of the pose graphs, and other combination methods may be employed.

INDUSTRIAL APPLICABILITY

As described above, the present invention can be suitably utilized for an information processing device and a mobile robot capable of ensuring the accuracy of estimation of a self-position even with an environmental change and maintaining the consistency of the self-position on a map.

LIST OF THE REFERENCE NUMERALS

1 Mobile Robot
2 Control Section
3 Detection Section
4 Mobile Section
23 Map Producer
24 Existing Map Self-Position Estimator
25 Current Map Self-Position Estimator
26 Reliability Evaluator
27 Self-Position Updater
28 Storage

The invention claimed is:

1. An information processing device for estimating a self-position of a mobile body based on a map of environment where the mobile body travels, the mobile body including a driver and a wheel to be rotatably driven by the driver, the information processing device comprising:
a detection section configured to detect, as detection information, a distance to an object at a periphery of the mobile body and a direction of the object; and
a control section configured to control the detection section,
wherein the control section includes
a storage configured to store the detection information, which has been detected by the detection section, in chronological order and store a map,
a map producer configured to produce a map of the periphery of the mobile body based on the detection information stored in the storage and store the map in the storage,
an existing map self-position estimator configured to estimate a current self-position of the mobile body by matching an existing map previously produced and stored in the storage with the detection information,
a current map self-position estimator configured to estimate a current self-position of the mobile body by matching a current map being currently produced and stored in the storage with the detection information,
a reliability evaluator configured to evaluate a reliability of each self-position estimated by the existing map self-position estimator and the current map self-position estimator, wherein the evaluated reliability of the existing map self-position is lowered in case where there is an environmental change related to the object at the periphery of the mobile body, and wherein the evaluated reliability of the current map self-position is lowered in case where the detection information is erroneous,
a self-position updater configured to update at least one self-position whose reliability evaluated by the reliability evaluator is lower than the other, and
the control section is further configured to control the driver and the wheel based on the at least one self-position updated.

2. The information processing device according to claim 1, wherein
the self-position updater calculates a movement amount of each of the self-positions estimated by the existing map self-position estimator and the current map self-position estimator, and updates either one of the self-positions based on the calculated movement amount.

3. The information processing device according to claim 1, wherein
the self-position updater updates the self-position evaluated as a lower reliability by the reliability evaluator based on the self-position evaluated as a higher reliability.

4. The information processing device according to claim 1, wherein
the reliability evaluator sets a weight indicating the reliability of each self-position to a greater weight as the reliability of each self-position increases, and sets the weight to a smaller weight as the reliability of each self-position decreases, and
the self-position updater updates at least either one of the self-positions based on the weight set by the reliability evaluator.

5. The information processing device according to claim 1, wherein
the estimation of the current self-position by the existing map self-position estimator and the estimation of the current self-position by the current map self-position estimator are executed in parallel.

6. The information processing device according to claim 5, wherein
the evaluation of the reliability of the self-position by the existing map self-position estimator and the evaluation of the reliability of the self-position by the current map self-position estimator are executed in parallel.

7. The information processing device according to claim 1, wherein
the self-position updater rewrites the one self-position with a lower reliability with the other self-position with a higher reliability.

8. A mobile robot comprising:
an information processing device for estimating a self-position of a mobile body based on a map of environment where the mobile body travels; and
a mobile section configured to move the mobile body,
the information processing device comprising:
a detection section configured to detect, as detection information, a distance to an object at a periphery of the mobile body and a direction of the object; and
a control section configured to control the detection section,
wherein the control section includes:
a storage configured to store the detection information, which has been detected by the detection section, in chronological order and store a map,
a map producer configured to produce a map of the periphery of the mobile body based on the detection information stored in the storage and store the map in the storage,
an existing map self-position estimator configured to estimate a current self-position of the mobile body by matching an existing map previously produced and stored in the storage with the detection information,
a current map self-position estimator configured to estimate a current self-position of the mobile body by matching a current map being currently produced and stored in the storage with the detection information,
a reliability evaluator configured to evaluate a reliability of each self-position estimated by the existing map self-position estimator and the current map self-position estimator, wherein the evaluated reliability of the existing map self-position is lowered in case where there is an environmental change related to the object at the periphery of the mobile body, and wherein the evaluated reliability of the current map self-position is lowered in case where the detection information is erroneous, and
a self-position updater configured to update at least one self-position whose reliability evaluated by the reliability evaluator is lower than the other.

9. A method of moving a mobile body, the method comprising:
estimating a self-position of the mobile body in environment that includes an object; and
autonomously moving the mobile body in the environment using the estimated self-position of the mobile body, wherein
the estimating of the self-position of the mobile body includes:
storing an existing map in a storage, the existing map being produced previously and representing the environment;
acquiring detection information from a laser scanner, the detection information indicating a distance to the object from the mobile body and a direction of the object from the mobile body;
producing a current map based on the detection information, the current map being currently produced and representing the environment;
estimating a first current self-position of the mobile body by matching the existing map with the detection information;
estimating a second current self-position of the mobile body by matching the current map with the detection information;
evaluating a first reliability of the first current self-position and a second reliability of the second current self-position, wherein the evaluated first reliability is lowered in case where there is an environmental change related to the object at the periphery of the mobile body, and wherein the evaluated second reliability is lowered in case where the detection information is erroneous;
updating at least one of the first current self-position and the second current self-position based on the first reliability and the second reliability, the at least one of the first current self-position and the second current self-position having lower reliability than the other of the first current self-position and the second current self-position.

* * * * *